2 Sheets--Sheet 1.

W. McK. THORNTON & T. A. BUCKLAND.

Improvement in Spark-Arresters for Locomotive-Engines.

No. 5,687. Reissued Dec. 16, 1873.

Witnesses.
R. T. Campbell
J. Williams

Inventor
William McK. Thornton
Thomas A. Buckland
by
Mason Fenwick & Lawrence
Attys AM. PHOTO-LITHOGRAPHIC Co. N.Y. (OSBORNE'S PROCESS)

2 Sheets--Sheet 2.

W. McK. THORNTON & T. A. BUCKLAND.

Improvement in Spark-Arresters for Locomotive Engines.

No. 5,687.

Reissued Dec. 16, 1873.

Witnesses.
R. G. Campbell
Jno. Williams

Inventor
Thomas K. Thornton
Thomas A. Buckland
Mason Fenwick & Lawrence
Attys.

AM. PHOTO-LITHOGRAPHIC Co. N.Y. (OSBORNE'S PROCESS)

UNITED STATES PATENT OFFICE.

WILLIAM McKELVY THORNTON AND THOMAS ALFRED BUCKLAND, OF ST. LOUIS, MISSOURI.

IMPROVEMENT IN SPARK-ARRESTERS FOR LOCOMOTIVE-ENGINES.

Specification forming part of Letters Patent No. 132,877, dated November 5, 1872; reissue No. 5,687, dated December 16, 1873; application filed December 1, 1873.

*To all whom it may concern:*

Be it known that we, WILLIAM McKELVY THORNTON and THOMAS ALFRED BUCKLAND, both of the city and county of St. Louis, State of Missouri, have invented new and useful Improvements in Spark-Arresters for Locomotive-Engines, of which the following is a full, clear, and exact description, reference being had to the annexed drawings making a part of this specification, in which—

Figure 1:
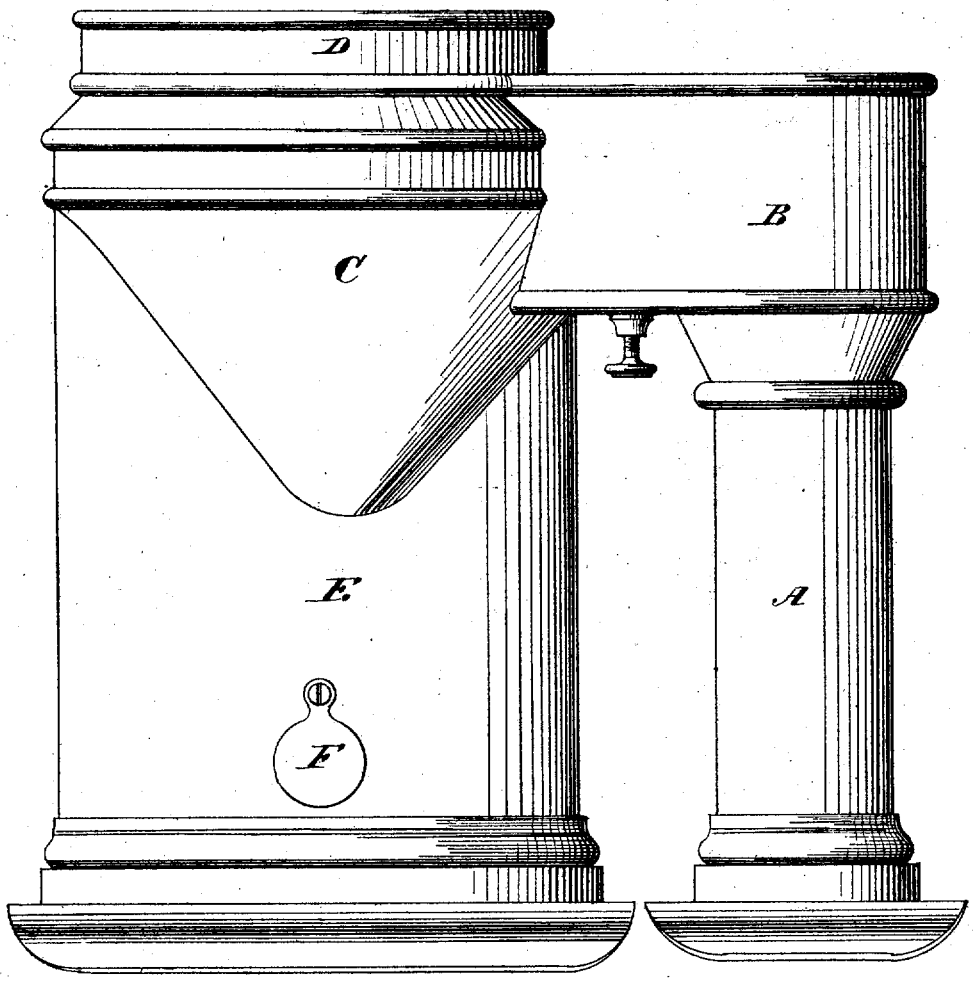
Figure 2:
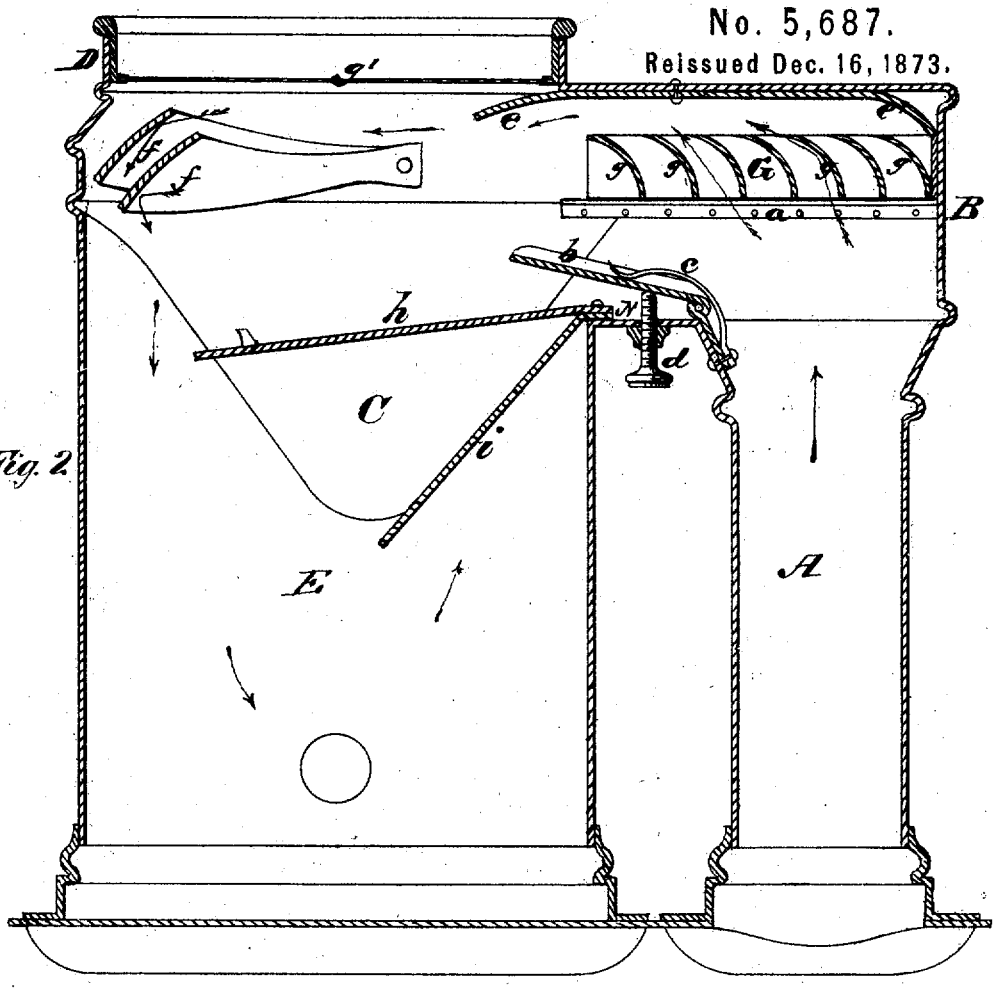
Figure 3:
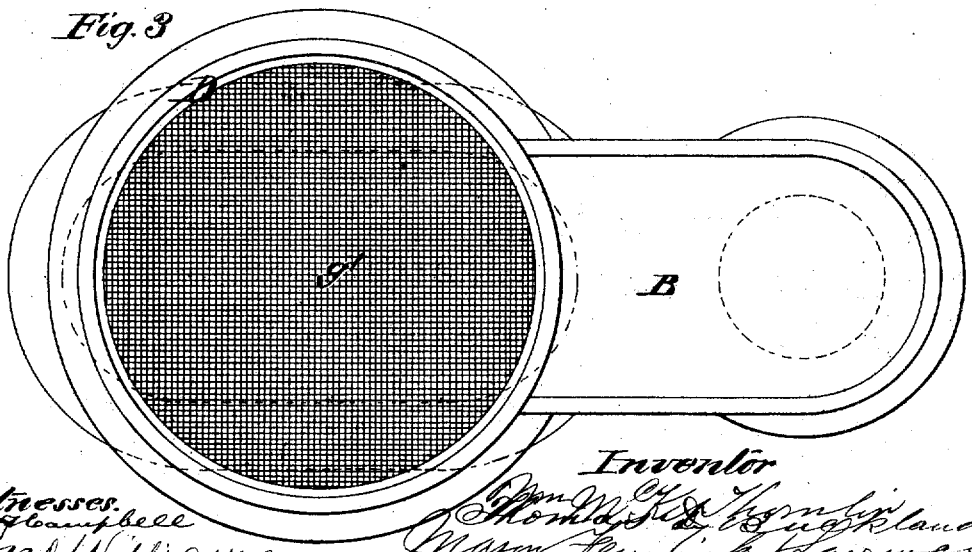

Figure 1 represents a side elevation of the smoke-stack of a locomotive having our spark-arrester attached to it. Fig. 2 represents a vertical longitudinal section of same. Fig. 3 represents a top plan of same.

Similar letters indicate like parts.

This invention is designed for preventing sparks which rise from the caps or upper ends of locomotive smoke-stacks from escaping into the air.

In carrying out our invention, we conduct the smoke and sparks, as they leave the smoke-stack, through a close cap which is on top of this stack, and in which are arranged a series of deflecting-plates and an adjustable draft-regulating valve; and from this cap the sparks are directed downward and backward into a reservoir covered by a wire-netting, and in which the sparks are collected, as will more clearly appear hereafter.

In the accompanying drawings, A represents the stack of a locomotive, the stack being of the usual or any other suitable height. The upper end of this stack is slightly flaring, and has upon it a cap, B, the front sides and top of which are closed, while the rear end is open and communicates with the reservoir E, at or near the upper end thereof. The width of the cap B need not be greater than the diameter of the stack A, but the length thereof is somewhat greater, so that the sparks will be conducted backward over a bottom plate, N, and valve *b*, Fig. 2, a short distance before they are directed down into the reservoir E. Between the top of the smoke-stack and the top of the cap B are a number of deflectors, *g*, extending transversely across the cap, and secured by their ends to horizontal side plates G, Fig. 2, which rest upon ledges *a*. The plates *g* are curved and inclined backward, as shown in Fig. 2, so that the sparks, after leaving the upper end of the stack, will be directed backward and downward. Above the deflecting-plates *g*, and secured to the top plate of the cap B, on the inside of the cap, are two curved deflecting-plates, *e e'*, the latter serving to keep the sparks out of the extreme front corner of the cap B, while the former, which curves backward and downward in rear of the deflectors *g*, direct the sparks downward into the reservoir E, as indicated by the arrows in Fig. 2. Just above the bottom extension N is the valve or false bottom *b*, which is hinged in front, and held down upon the end of an adjusting-screw, *d*, by means of a spring, *c*, Fig. 2. The screw *d* is tapped through the bottom N, and is used for raising the rear end of the valve *b*, when it is desired to contract the outlet from the cap B and sharpen the draft, thus enabling the engineer to increase or diminish the draft at pleasure. The cap B opens into an inverted conical chamber, C, which is circular in horizontal section, and secured to the top of the reservoir E. The upper end of this conical chamber is contracted somewhat, and covered by a wire-netting, *g'*, applied to a cap, D. The rear portion of the conical wall is cut away, and so also is its front upper portion, and the edges of said portions are riveted to the elliptical wall of the reservoir E. This forms a head on the reservoir, and at the same time leaves an inclined deflector, *i*. The body of the reservoir is elliptical in horizontal section, the longest axis of the ellipse extending from front to rear, and this reservoir, like the stack A, is secured fast upon the boiler-shell by means of a saddle, as seen in Fig. 2. To the rear termination of the bottom plate N a shield, *h*, is secured and sustained in nearly a horizontal position over the inclined deflector *i*. This shield is circular, and there is a space between it and the wall of the chamber C, all around, excepting where it is attached to the bottom plate N. This shield serves to prevent the sparks falling into the reservoir from again rising above it. In consequence of the great exhaustion which takes place in the reservoir E and the eddies of air therein, most of the sparks which rise will be caught by the deflector *i*, and prevented from escaping above the shield *h*, while those passing the deflector *i* will be arrested by shield *h*. The sparks which cross directly over to the back of the chamber C strike against one or more curved deflectors, *f f*, Fig. 2, which not only direct those sparks downward, but they also shield the cone and reservoir from rapid destruction. As, however, there are no draft-openings into the reservoir below, there will be but little tendency for the sparks to rise after they fall to the bottom of the reservoir; consequently, in many cases, the curved deflectors *f f* and shield *h* will be found to be unnecessary, and may be dispensed with. The openings into the reservoir for removing the accumulated sparks will be closed by tightly-fitting valves F, Figs. 1, 2.

What we claim as new, and desire to secure by Letters Patent, is—

1. The imperforated cap B, having curved deflectors *g g* applied within it, in combination with the stack A and reservoir E, the latter having a perforated top, all arranged substantially in the manner described.

2. The combination of the deflector *e*, curved deflectors *g g*, and the imperforated cap B, substantially in the manner and for the purpose described.

3. The combination of the deflector *e*, imperforated cap B, stack A, and reservoir E, the latter having a perforated top, and all arranged, constructed, and operating substantially as and for the purpose shown and specified.

4. The adjustable valve *b*, in combination with the cap B, smoke-stack A, and reservoir E, substantially as described.

5. The combination of the deflecting and receiving reservoir E, having a perforated top, the conical connecting-chamber C, formed and located as described, imperforated deflecting-cap B, and smoke-stack A, substantially as described.

6. The combination of the imperforated cap B, smoke-stack A, and reservoir E, the latter having a perforated top, all constructed, arranged, and operating as and for the purpose shown and specified.

7. The shield *h*, arranged in the reservoir, in combination with the close cap B, substantially as described.

8. The deflector *i*, combined with the shield *h*, and arranged substantially as described.

9. The deflector *f*, arranged as described, in combination with the close cap B and shield *h*, substantially as described.

WM. McK. THORNTON.
THOS. A. BUCKLAND.

Witnesses:
SAML. S. BOYD,
CHAS. D. MOODY.